United States Patent [19]

Kishida et al.

[11] Patent Number: 4,513,111

[45] Date of Patent: Apr. 23, 1985

[54] PROCESS FOR PRODUCING IMPACT-RESISTANT RESINS

[75] Inventors: Kazuo Kishida; Naoki Yamamoto; Kozi Nishida, all of Ohtake; Toshihito Narita, Yokohama; Yasumasa Sato, Ohtake, all of Japan

[73] Assignee: Mitsubishi Rayon Co., Ltd., Tokyo, Japan

[21] Appl. No.: 473,369

[22] Filed: Mar. 8, 1983

Related U.S. Application Data

[63] Continuation-in-part of Ser. No. 227,583, Jan. 23, 1981, abandoned.

[30] Foreign Application Priority Data

Jan. 30, 1980 [JP] Japan ................................. 55-9709
Feb. 20, 1980 [JP] Japan ................................. 55-20159

[51] Int. Cl.$^3$ ............................ C08F 2/16; C08L 9/04; C08L 9/08; C08L 9/10
[52] U.S. Cl. ..................................... 524/458; 525/132; 525/310; 524/333; 524/343; 524/350
[58] Field of Search ............... 524/458, 333, 343, 350; 525/132, 310

[56] References Cited

U.S. PATENT DOCUMENTS 3,625,874 12/1971 Cottman et al. .................... 525/132
3,763,278 10/1973 Griffith ................................ 525/310
4,141,932 2/1979 Butler .................................. 525/86

*Primary Examiner*—Joseph L. Schofer
*Assistant Examiner*—N. Sarofim

*Attorney, Agent, or Firm*—Brumbaugh, Graves, Donohue & Raymond

[57] ABSTRACT

In a process comprising adding an ethylenic monomer or monomer mixture (B) to a rubbery polymer (A) latex, emulsion-polymerizing it to produce a graft copolymer (C) latex, then adding an acidic substance or an electrolyte to said graft copolymer (C) latex to partially coagulate the latex, thereafter either first adding an ethylenic monomer or monomer mixture (D) and then adding a suspension polymerization stabilizer or simultaneously adding an ethylenic monomer or monomer mixture (D) and a suspension polymerization stabilizer, and carrying out suspension polymerization to obtain a graft copolymer (E) in the form of beads, a process for producing an impact-resistant resin wherein:

(1) said rubbery polymer (A) contains at least 60% by weight of a diene monomer component and has a degree of swelling of 10–35, a gel content of 70% by weight or more and a weight average particle diameter of 0.2–0.5$\mu$ and the major part of the particles has a particle diameter ranging from 0.03$\mu$ to 1.0$\mu$;

(2) said ethylenic monomer or monomer mixture of (B) and (D) independently comprises 50–100% by weight of an aromatic vinyl monomer and 50–0% by weight of a vinyl monomer copolymerizable therewith; and;

(3) said graft copolymer (C) has a free polymer rate of 10% or higher and a reduced viscosity ($\eta_{sp}/C$), determined by dissolving 0.1 g of its acetone-soluble fraction into 100 ml of N,N-dimethylformamide and measuring the viscosity at 25° C., of 0.3–1.0 dl/g.

12 Claims, No Drawings

PROCESS FOR PRODUCING IMPACT-RESISTANT RESINS

This application is a continuation-in-part application of the application, Ser. No. 227,583 filed Jan. 23, 1981, now abandoned.

This invention relates to a process for producing a thermoplastic resin excellent in impact resistance.

ABS resin, generally regarded as the representative of impact-resistant resins, is constituted mainly of polybutadiene or styrene-butadiene rubber (SBR), styrene and acrylonitrile. From the viewpoint of polymerization process, its mode of industrial practice can roughly be classified into emulsion polymerization process, bulk polymerization process, suspension polymerization process, solution polymerization process, bulk-suspension two-step polymerization process, emulsion-bulk polymerization process and emulsion-suspension polymerization process.

However, all the above-mentioned polymerization processes cannot be said to be satisfactory in all points. For example, though emulsion polymerization process is excellent in the easiness of reaction control and the production stability, it consumes very large quantities of water and electric power in the steps of coagulation, washing and drying. Further, the use of salt, acid or the like is indispensable in the coagulation step and such impurities quite difficult to remove form a great cause of the coloration at the time of thermoforming.

In bulk polymerization process, the rubber elastomer component must be dissolved into monomer, so that the process is limited to cases of using soluble rubber. Further, the rubber content is limited due to the viscosity-increasing phenomenon of polymerization system, and the local generation of heat is difficult to control because of bulk polymerization.

Suspension polymerization process also has the problem of dissolving rubber elastomer into monomer, the problem of form of the product, and the problem of uneven dispersion of rubber in the product.

In solution polymerization process, a very large quantity of utilities are needed for recovering the solvent, though the procedure and control of reaction are easy in this process.

Bulk-suspension two-step polymerization process has the same problem as in bulk polymerization process in the point that it involves a step for dissolving elastomer and the step of polymerization must be carried out at a high viscosity.

In emulsion-bulk polymerization process, styrene and acrylonitrile are emulsion-polymerized onto a butadiene type elastomer to form a graft copolymer, this graft copolymer is extracted with monomer and then a bulk polymerization is carried out. Similarly to the case of bulk polymerization, however, there is a problem of controlling the locally generated heat and, in addition, if the rubber content is high, the deterioration of rubber due to local generation of heat is unavoidable, so that the design of continuous polymerization process and the design of polymer-producing apparatus are laborious. Further, in the phase of production, the change of product type unavoidably becomes difficult.

In emulsion-suspension polymerization process, styrene and acrylonitrile are emulsion-polymerized onto a butadiene type elastomer to form a graft copolymer, a partial coagulant, a suspension polymerization stabilizer and a monomer are added to this graft copolymer emulsion latex, it is subjected to suspension polymerization and the product is recovered in the form of beads. Therefore, this process is so excellent in the easiness of polymerization reaction control and the production stability as to be comparable to emulsion polymerization. Further it necessitates no coagulation step nor washing step, so that the consumption of utilities is small, the contamination of impurities is small and hence the stability of thermoforming is improved.

A technique of emulsion-suspension polymerization is disclosed also in U.S. Pat. No. 4,141,932. However, the technique has faults in that it is difficult to obtain a composition rich in rubber content and in other points, and has not yet been industrialized. When a composition of high rubber content is desired, various problems due to polymerization stability will be induced. Thus, in some cases, coarse granules are formed or a pasty mass is formed. Further, in some cases, the moldability of product is deteriorated or the appearance of molded product becomes lacking flatness due to a problem concerning the agglomeration of rubber in the product. Further, in some cases, a satisfactory impact resistance cannot be obtained due to a problem relating to the design of polymer structure.

Further, when a composition of high rubber content is obtained in the form of beads, there is a tendency that the water content of wet polymer powder after dehydration by centrifugal dehydrating machine is high and the bulk density of the polymer powder after drying becomes low, whereby the advantages of emulsion-suspension polymerization are impaired partly. No method for solving all these points simultaneously is yet found at the present stage, and an industrial practice of emulsion-suspension polymerization process is difficult without improvement of these points.

In view of the above-mentioned present status of things, the inventors conducted earnest studies with the aim of improving the prior processes for producing impact-resistant resins and, as the result, this invention was accomplished.

This invention provides, in a process comprising (a) adding an ethylenic monomer or monomer mixture (B) to a rubbery polymer (A) latex and emulsion-polymerizing them to produce a graft copolymer (C) latex, followed by (b) adding an acidic substance or an electrolyte to said graft copolymer (C) latex to coagulate the latex partially, and (c) either first adding an ethylenic monomer or monomer mixture (D) and then adding a suspension polymerization stabilizer or simultaneously adding an ethylenic monomer or monomer mixture (D) and a suspension polymerization stabilizer and carrying out a suspension polymerization to obtain a graft copolymer (E) in the form of beads, a process for producing an impact-resistant resin characterized in that:

(1) said rubbery polymer (A) contains at least 60% by weight of diene type monomer component, has a degree of swelling of 10–35, a gel content of 70% by weight or more and a weight average particle diameter of 0.2–0.5$\mu$ as measured for 5,000 or more particles counted on an electron microscopic photograph and the major part (90% by weight or more) of the particles has a particle diameter ranging from 0.03$\mu$ to 1.0$\mu$, (2) said ethylenic monomer or monomer mixture of (B) and (D) independently comprises 50–100% by weight of an aromatic vinyl monomer and 50–0% by weight of a vinyl monomer copolymerizable therewith, (3) said graft copolymer (C) has a free polymer rate of 10% or more and a reduced viscosity, as measured by dissolving 0.1 g of its acetone-soluble fraction into 100 ml of N,N-dimethylformamide and carrying out viscosity measurement at 25° C. (hereinafter referred to as $\eta_{sp}/C$ of acetone-soluble fraction), of 0.3–1.0 dl/g, (4) said rubbery polymer (A) is 25–70% by weight in said graft copolymer (E); and (5) said acidic substance or electrolyte is added to said graft copolymer (C) latex to form a partial coagulum with a solid content of 15–50%.

In this invention, degree of swelling and gel content are defined in the following manner.

Thus, $W_0$ g of rubbery polymer (A) is immersed in about 50 times its amount of toluene at 30° C. for 48 hours. The weight of the swollen sample is denoted by $W_1$ g. $W_1$ g of the swollen sample is dried in vacuum till it reaches a constant weight, and its weight after drying is denoted by $W_2$ g. Then, $$\text{degree of swelling} = \frac{W_1 - W_2}{W_2}$$

$$\text{gel content} = \frac{W_2}{W_0} \times 100 \, (\%)$$

Free polymer rate and $\eta_{sp}/C$ of acetone-soluble fraction are defined as follows.

The polymer not grafted to rubbery polymer (A) (hereinafter referred to as free polymer) is separated from graft copolymer (C) by means of extraction with acetone and its weight is measured, based on which free polymer rate is expressed as:

$$\text{free polymer rate} = \frac{\text{Weight of acetone} - \text{soluble polymer}}{\text{weight of rubbery polymer (A)}} \times 100 \, (\%)$$

On the other hand, $\eta_{sp}/C$ of acetone-soluble fraction is determined by dissolving 0.1 g of this separated polymer, extracted with acetone, into 100 ml of N,N-dimethylformamide and measuring the viscosity at 25° C. by means of Ostwald viscometer.

The process of this invention can be applied to the cases in which all kinds of diene type rubbers such as natural rubber, butadiene rubber, styrene-butadiene rubber, acrylonitrile-butadiene rubber, isoprene rubber, chloroprene rubber, ethylene-propylenebutadiene rubber and the like are used as rubbery polymer (A), and enables to produce an impact-resistant resin excellent in the uniformity of fine granular shape, good in heat stability and excellent in impact resistance, moldability and appearance of molded product. In this case, it is necessary that the rubbery polymer (A) contains 60% by weight or more of diene type monomer in its monomer composition (preferably it is a copolymer comprising 80% or more of butadiene and 20% or less of styrene) and its degree of crosslinking is in the range expressed by a gel content of 70% or more and a degree of swelling of 10–35. If the diene content and the degree of crosslinking are out of the above-mentioned ranges, a composition excellent in impact resistance, moldability and appearance at the time of forming cannot be obtained.

If an uncrosslinked or insufficiently crosslinked rubbery polymer component having a gel content lower than 70% and/or a degree of swelling exceeding 35 is used, the rubber particles in the composition agglomerate and are deformed to the direction of resin flow at the time of forming, so that there appear faults such as deficient surface gloss, bad appearance of molded product, and so on.

On the other hand, if an excessively crosslinked rubbery polymer having a degree of swelling less than 10 is used, the product has a fault that it is poor in impact resistance.

Regarding particle diameter, in the case of resin compositions obtainable by dispersing rubber particles in a continuous resin phase, too small a particle diameter generally brings about a fault that the development of impact resistance is not good and, inversely, too large a particle diameter brings about a fault that the product is poor in moldability. For the above-mentioned reasons, it is necessary in this invention that particle diameter of rubbery polymer (A) is 0.2–0.5$\mu$ in terms of weight average particle diameter and the major part of particles have a particle diameter ranging from 0.03$\mu$ to 1.0$\mu$ in order to obtain a composition excellent in both impact resistance, moldability and appearance at the time of forming and well balanced in these properties.

As the ethylenic monomer used in the emulsion polymerization part constituting the first step of this invention and in the suspension polymerization part constituting the second step of this invention, aromatic vinyl monomers such as styrene, α-methylstyrene, p-substituted styrenes and the like and, optionally, vinyl monomers copolymerizable therewith such as acrylonitrile, methacrylonitrile, acrylic esters, methacrylic esters and the like are used. The monomers used in the emulsion polymerization part and the suspension polymerization part may be the same or different in kind.

With consideration of impact resistance and moldability, it is necessary that the proportion of aromatic vinyl monomer to the vinyl monomer copolymerizable therewith is in the range of 50–0% by weight of the vinyl monomer per 50–100% by weight of the aromatic vinyl monomer. Preferably, styrene 100% by weight (styrene alone) or a mixture comprising 60% by weight or more of styrene and 40% by weight or less of acrylonitrile is used. So far as the proportion is in said range, the monomer used in the emulsion polymerization part and the monomer used in the suspension polymerization part may be the same or different.

The proportion of rubbery polymer (A) is 25–70% by weight based on the graft copolymer (E) or the impact resistant resin obtained. If the rubber content is less than 25% by weight, an impact-resistant resin composition having desired properties can not be always obtained when blending it with any of various other copolymers. Further, in production of a resin composition having a definite rubber content, a use of a composition having such rubber content as less than 25%, as compared with a one of a higher rubber content, gives a product of undesired quality such as poor in color. This is industrially disadvantageous. If the rubber content exceeds 70%, the rubber particles agglomerate at the time of polymerization reaction and/or molding process so that the polymerization system becomes instable and/or moldability and appearance of molded product can become bad.

In the emulsion polymerization part constituting the first step of emulsion-suspension polymerization process, it is generally difficult to make the conversion of polymerization 100%. In the process of this invention, however, an impact-resistant resin having excellent impact resistance, moldability and appearance of molded product can be produced even if a reaction mixture containing some quantity of residual unreacted monomer (polymerization conversion 75% or more) is transferred to the suspension polymerization part of the second step.

The product in the emulsion polymerization part, i.e. graft copolymer (C) latex, is obtained by introducing rubbery polymer (A) latex, an emulsifier, a polymerization initiator, monomer (B) and, if necessary, a chain transfer agent into the reactor and effecting emulsion polymerization at 40°–120° C.

As the emulsifier, known anionic emulsifiers such as sodium alkylbenzenesulfonate and the like can be used.

As the polymerization initiator, water-soluble inorganic initiators such as persulfates and perborates can be used either alone or as a redox initiator combined with sulfite, bisulfite, thiosulfate or the like.

Further, redox initiator systems such as organic hydroperoxide-ferrous salt, and organic hydroperoxide-sodium formaldehyde sulfoxylate can also be used.

As mentioned later, the regulations of degree of polymerization and free polymer rate are important factors in the process of this invention. If it is necessary for the regulation of degree of polymerization and free polymer rate, a chain transfer agent may be used. As said chain transfer agent, alkylmercaptans, as well as alkyl halides, alkyl sulfides, alkyl disulfides, thioglycolic esters and α-methylstyrene dimer are used, among which alkylmercaptans having $C_4$–$C_{12}$ alkyl group are particularly preferable.

Though the time period required for polymerization varies depending upon the kind and amount of initiator and the polymerization temperature, it is usually 0.5–10 hours.

Relating to graft copolymer (C), there is an important condition in this invention that free polymer rate should be 10% or more and $\eta_{sp}/C$ of acetone-soluble fraction should be 0.3–1.0 dl/g.

If $\eta_{sp}/C$ is less than 0.3 dl/g, an excellent impact resistance cannot be obtained even though moldability and appearance of molded product are generally good. It is surprising that this nature cannot be altered even if various modifications are attempted in the suspension polymerization part.

If free polymer rate is less than 10% and/or $\eta_{sp}/C$ of the acetone-soluble fraction exceeds 1.0 dl/g, there often occurs an instabilization of the system at the time of phase transition from the emulsion state to the suspension state, so that a pasty mass is formed or enlarged particles are formed. Even if the polymerization reaction is completed smoothly, a composition having excellent moldability and excellent appearance of molded product cannot be obtained. Thus, the product is poor in flow property, difficult to form at conventional temperature and pressure and lacking in flatness of the appearance of molded product.

Graft copolymer (E) is obtained by adding a partial coagulant such as acidic substance, electrolyte or the like, a suspension polymerization stabilizer, monomer (D) and a polymerization initiator to graft copolymer (C) latex and carrying out suspension polymerization at 40°–120° C.

As said partial coagulant, all kinds of acids and water-soluble inorganic salts can be used. The acids include mineral acids such as sulfuric acid, hydrochloric acid and the like and organic acids having a dissociation constant of $10^{-6}$ mole/liter or more such as acetic acid and the like (benzoic acid, salicyclic acid, formic acid, and tartaric acid are included). The salts include sulfates such as magnesium sulfate, sodium sulfate and the like as well as chlorides and acetates, though the salts are not limited to them.

As said suspension polymerization stabilizer, usual inorganic dispersants and organic dispersants can be used.

As said inorganic dispersant, magnesium carbonate, calcium tertiary phosphate and the like can be referred to. Among the organic dispersants, natural and synthetic polymer dispersants include starch, gelatin, acrylamide, polyvinyl alcohol, partially saponified polyvinyl alcohol, partially saponified polymethyl methacrylate, polyacrylic acid and its salts, methyl methacrylate-methacrylic acid salt copolymer, methyl methacrylate-acrylic acid salt copolymer, cellulose, methyl cellulose, hydroxymethyl cellulose, hydroxyethyl cellulose, polyalkylene oxide, polyvinyl pyrrolidone, polyvinyl imidazole, sulfonated polystyrene and its salts, and the like. As low molecular weight dispersant, usual emulsifiers such as alkylbenzenesulfonates, fatty acid salts and the like can also be used. Among them, preferable are sulfonated polystyrene salts, methyl methacrylate-methacrylic acid salt copolymer, methyl methacrylate-acrylic acid salt copolymer and polyvinyl alcohol.

As to the order of addition of graft copolymer (C) latex, partial coagulant, monomer (D) and suspension polymerization stabilizer, it is necessary to add the partial coagulant to the graft copolymer (C) latex and thereafter to add monomer (D) and the suspension polymerization stabilizer. As to monomer (D) and the suspension polymerization stabilizer, they may be added simultaneously or it is also allowable to add monomer (D) first and then to add the suspension polymerization stabilizer. It is also allowable to first add a portion of suspension polymerization stabilizer together with the partial coagulant, thereafter to add the monomer and finally to add the residual portion of the suspension polymerization stabilizer.

If the order of the addition is other than above, the polymerization system becomes instable so that coarse granules can be formed or pasty mass can be formed.

It is also necessary that, when the partial coagulant is added to the graft copolymer (C) latex to partially coagulate the system, the solid content in the system be 15 to 50%, preferably 20 to 40%. If the solid content is less than 15%, the water content of the wet powder obtained by centrifugally dehydrating the beads produced in the subsequent suspension polymerization becomes high, the energy required for drying increases inevitably, the bulk density of beads after drying becomes low, and the storage facility for produced beads becomes large. Thus, various industrial disadvantages are incurred. If the solid content exceeds 50%, the stability of the subsequent suspension polymerization is reduced substantially and coagulation takes place in the course of polymerization.

As the polymerization initiator for the suspension polymerization part, peroxides such as benzoyl peroxide, lauroyl peroxide and the like and azo compounds such as azobisisobutyronitrile can be used.

Further, a chain transfer agent may be used in order to regulate the degree of polymerization. As said chain transfer agent, ester type mercaptans such as alkylmercaptans having 2–18 carbon atoms, thioglycolic esters, β-mercaptopropionic esters and the like; mercapto acids such as thioglycolic acid, β-mercaptopropionic acid and the like; benzylmercaptan; and aromatic mercaptans such as thiophenol, thiocresol, thionaphthol and the like can be used. Among them, particularly preferable are alkylmercaptans having $C_4$–$C_{12}$ alkyl group.

Though the method for adding the polymerization initiator and the chain transfer agent is not particularly limited, a method which comprises dissolving both of the polymerization initiator and the chain transfer agent into monomer (D), a method which comprises dissolving one of them into monomer (D) and adding the other into graft copolymer (C) latex, a method which comprises adding both the agents into graft copolymer (C) latex, and a method which comprises adding one or both of them into a mixed system of graft copolymer (C) latex, partial coagulant, suspension polymerization stabilizer and monomer (D), and so on can be employed.

Though the time period necessary to the polymerization varies depending upon the kind and amount of initiator and the polymerization temperature, it is usually 0.5–10 hours.

The polymer obtained by the suspension polymerization has to be subjected to a drying step. However, in the drying means today employed industrially such as fluidized-bed dryer, paddle dryer and the like, a portion of the powder can reside in the dryer for a long period of time. On the other hand, the rubber elastomer component used in impact resistant resins has a fault that it is so poor in heat stability and weather resistance as to be denatured and colored with deterioration of mechanical properties when heated for a long period of time. In order to solve this problem, it is preferable to add a phenolic compound in the course of suspension polymerization, by which the phenolic compound is uniformly adsorbed on the polymer particles and the suspension polymerization progresses smoothly and the heat stability of the resulting impact-resistant resin is improved markedly. In contrast to it, if the phenolic compound is dissolved into the ethylenic monomer to be polymerized in the suspension polymerization and simultaneously added with the monomer, it may have an effect of improving the heat stability but the phenolic compound acts as a radical-capturing agent so that the suspension polymerization does not progress smoothly, the polymerization stability drops markedly and agglomeration can readily take place. Further, the resulting polymer and the aqueous system contain a large quantity of residual ethylenic monomer, which incurs a rise of production cost and a problem of environmental pollution. In another method wherein the phenolic compound is added before shifting to a state of suspension, there arise problems similar to the problems in the above-mentioned case that the phenolic compound is dissolved into ethylenic monomer.

If other antioxidant such as phosphite compounds or sulfur-containing compounds is added, there is no problem concerning suspension polymerization but no sufficient effect is noticeable concerning the intended improvement of heat stability.

Further, in a method wherein the phenolic compound is added to wet powder of polymer before drying by means of a mixing machine such as V-type blender, ribbon mixer, Henschel mixer or the like, it is not uniformly adsorbed on the polymer particles so that an uneven coloration takes place when heated for a long period of time. In such a method of addition, similar problem arises even when a phosphite compound is used.

The phenolic compound is added in an amount of 0.001% by weight or more and preferably 0.05% by weight or more based on the polymerized product. If it is less than above, the effect is small.

The phenolic compound is added in the form of a dispersion obtained by dispersing it uniformly in water by means of a surfactant or the like, or in the form of a solution obtained by uniformly dissolving the phenolic compound into a solvent insoluble in water and capable of dissolving the phenolic compound, or in the form of a dispersion obtained by dispersing the above-mentioned solution uniformly into water by means of a surfactant or the like.

The polymer particle thus obtained is of course quite excellent in longterm heat stability at a relatively low temperature such as the temperature of residence in the drying step, and it is also quite excellent in the heat stability at relatively high temperatures such as the temperature in extrusion molding, rolling, injection molding or the like.

Though the phenolic compound is added in the course of suspension polymerization as has been mentioned above, it is preferably added after the conversion of suspension polymerization has exceeded 50%, because, if it is added at too low a conversion of polymerization as just after the start of suspension polymerization, the polymerization still does not progress smoothly.

As examples of the phenolic compound used in this invention, 2,6-di-t-butylphenol, 2,6-di-t-butyl-p-cresol, 2,4-dimethyl-6-t-butylphenol, butylhydroxyanisole, 1,1-bis(4-hydroxyphenyl)cyclohexane, 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'-thiobis(3-methyl-6-t-butylphenol), tetrakis[methylene-3-(3,5-di-t-butyl-4-hydroxyphenyl)-propionate]methane, 1,1,3-tris(2-methyl-4-hydroxy-5-t-butylphenyl)butane and the like can be referred to. They can be used either alone or in combination of two or more members. It is also allowable to use other antioxidant in combination with them simultaneously.

In order to uniformly disperse the phenolic compound in water, a surfactant is used usually. Examples of said surfactant include anionic surfactants such as fatty acid salts, higher alcohol sulfuric ester salts, alkylbenzenesulfonic acid salts and the like; nonionic surfactants such as polyoxyethylene alkyl ether, polyoxyethylene alkylphenyl ether and the like; and substances which are also usable as suspension polymerization stabilizer such as gelatin, partially saponified polyvinyl alcohol, polyacrylic acid and its salts, methyl cellulose, hydroxyethyl cellulsoe, hydroxypropylmethyl cellulose, polyalkylene oxide and the like. They are used in an amount of 0.1–100 parts by weight per 100 parts by weight of the phenolic compound.

In order to uniformly dissolve the phenolic compound, a water-insoluble solvent may be used. Examples of said solvent include hydrocarbons such as toluene, xylene and the like; ethylenic monomers such as styrene and the like; molten products of relatively low-melting sulfur-containing compounds such as dilauroyl thiodipropionate and the like; phthalic esters such as dioctyl phthalate and the like; and, in special cases, liquid phenolic compounds such as 2,4-dimethyl-6-t-butylphenol.

It is also possible to add a plasticizer, a lubricant, an ultraviolet absorber and the like at the time of suspension polymerization.

By blending the impact-resistant resin obtained according to this invention with other resins, for example, vinyl polymers such as polypropylene, polystyrene, acrylonitrile-styrene copolymer, polymethyl methacrylate, polyvinyl chloride, polyvinylidene chloride and the like, or polycarbonate, thermoplastic polyester, polyamide and the like, their moldability and impact resistance can be improved to a remarkable extent.

In the following examples, part(s) means part(s) by weight and % means % by weight.

EXAMPLE 1

| (Mixture 1) | |
|---|---|
| Diene latex (solid content)* | 60 parts (30 parts) |
| Ferrous sulfate | 0.003 part |
| Dextrose | 0.5 part |
| Sodium pyrophosphate | 0.2 part |
| Disproportionated rosin acid soap | 2.5 parts |
| Sodium hydroxide | 0.1 part |
| Sodium methylenebisnaphthalene-sulfonate | 0.2 part |
| Deionized water | 150 parts |

*Solid content 50%
Degree of swelling 16.0
Gel content 83.1%
Weight average particle diameter 0.33μ
Monomer composition: butadiene 90%, styrene 10%

| (Mixture 2) | |
|---|---|
| Styrene | 22.2 parts |
| Acrylonitrile | 7.8 parts |
| Cumene hydroperoxide | 0.33 part |
| t-Dodecylmercaptan | 0.1 part |

(Mixture 1) was charged into a reactor. After replacing the inner atmosphere of the reactor with nitrogen, (Mixture 2) was dropped thereinto at 60° C. over a time period of 30 minutes with stirring at a stirring speed of 200 rpm.

Thereafter, polymerization was conducted for 3 hours to complete the reaction, whereby a graft copolymer latex was obtained. Conversion of polymerization was 80%, free polymer rate of the graft copolymer was 37%, and $\eta_{sp}/C$ of the acetone-soluble fraction was 0.56 dl/g.

The graft copolymer latex thus obtained (pH 11.0) was returned to room temperature, to which was added 8 parts of 10% aqueous solution of sulfuric acid with stirring at 350 rpm to form a highly viscous partial coagulum (pH 2.8). The partial coagulum had a solid content of 24.2%. Then a mixture of 29.6 parts of styrene, 10.4 parts of acrylonitrile, 0.2 part of benzoyl peroxide and 0.5 part of t-butylmercaptan was added, whereby the dispersion changed from the highly viscous state to a low-viscosity state (10 centipoises). To this dispersion was added 10 parts of an aqueous solution of sulfonated polystyrene sodium salt (0.3%, number average molecular weight 20,000) as a suspension stabilizer, and polymerization was carried out at 80° C. for 5 hours. The polymer was collected by filtration, dehydrated in a basket type centrifugal dehydrating machine (the water content in the dehydrated, wet polymer powder was 30% based on dried bead), and then dried. Conversion of polymerization was 97%. The polymer thus obtained was beautiful beads and had a bulk density of 0.30 g/cc as well as the following particle size distribution.

| Particle size distribution (mesh) | −20 | 20-40 | 40-60 | 60-80 | 80-100 | 100 pass |
|---|---|---|---|---|---|---|
| Weight (%) | 3 | 70 | 25 | 2 | 0 | 0 |

50 Parts of the dry particles, 50 parts of acrylonitrile-styrene copolymer ($\eta_{sp}/C=0.60$ at 25° C. in DMF) and 0.4 part of calcium stearate were blended together by means of Henschel mixer having a capacity of 10 liters at a speed of 3,000 rpm and then pelletized, from which test pieces were formed by means of injection molding. The molded product was free from thermal coloration and quite excellent in surface gloss.

COMPARATIVE EXAMPLE 1-1

The same (Mixture 1) as in Example 1 was charged into a reactor. After replacing the inner atmosphere of the reactor with nitrogen, the same (Mixture 2) as in Example 1 was dropped thereinto at 45° C. in 5 minutes with stirring at a stirring speed of 200 rpm. Then polymerization was conducted for 3 hours to complete the reaction, whereby a graft copolymer latex was obtained. Conversion of polymerization was 77%, free polymer rate of the graft copolymer was 45%, and $\eta_{sp}/C$ of the acetone-soluble fraction was 1.09 dl/g.

Subsequently, test pieces were prepared by repeating the treatment of Example 1.

COMPARATIVE EXAMPLES 1-2

| (Mixture 2) | |
|---|---|
| Styrene | 22.2 parts |
| Acrylonitrile | 7.8 parts |
| Cumene hydroperoxide | 0.33 part |
| t-Dodecylmercaptan | 0.8 part |

The same (Mixture 1) as in Example 1 was charged into a reactor. After replacing the inner atmosphere of the reactor with nitrogen, the above-mentioned (Mixture 2) was dropped thereinto at 75° C. in 90 minutes with stirring at a stirring speed of 200 rpm. Then polymerization was conducted for 3 hours to complete the reaction, whereby a graft copolymer latex was obtained. Conversion of polymerization was 84%, free polymer rate of the graft copolymer was 42%, and $\eta_{sp}/C$ of the acetone-soluble fraction was 0.26 dl/g.

Subsequently, test pieces were prepared by repeating the procedure of Example 1.

EXAMPLE 2

| (Mixture 1) | |
|---|---|
| Polybutadiene latex (solid content)* | 90 parts (45 parts) |
| Ferrous sulfate | 0.005 part |
| Dextrose | 0.5 part |
| Sodium pyrophosphate | 0.2 part |
| Disproportionated rosin acid soap | 1.0 part |
| Sodium hydroxide | 0.02 part |
| Sodium methylenebisnaphthalene-sulfonate | 0.2 part |
| Deionized water | 150 parts |

* Solid content 50%
Degree of swelling 24.0
Gel content 76.3%

Weight average particle diameter 0.28μ

-continued

Monomer composition: butadiene 100%

(Mixture 2)

| Styrene | 14.8 parts |
|---|---|
| Acrylonitrile | 5.20 parts |
| Cumene hydroperoxide | 0.2 part |

(Mixture 3)

| Styrene | 11.1 parts |
|---|---|
| Acrylonitrile | 3.9 parts |
| Cumene hydroperoxide | 0.3 part |
| t-Dodecylmercaptan | 0.3 part |

(Mixture 1) was charged into a reactor. After replacing the inner atmosphere of the reactor with nitrogen, (Mixture 2) was dropped thereinto for 10 minutes at 60° C. with stirring at a stirring speed of 150 rpm. One hour after completion of the dropping, (Mixture 3) was dropped for 30 minutes. Thereafter, polymerization was conducted for 3 hours to complete the reaction, whereby a graft copolymer latex was obtained. Conversion of polymerization was 88%, free polymer rate of the graft copolymer was 36%, and $\eta_{sp}/C$ of the acetone-soluble fraction was 0.54 dl/g.

The graft copolymer latex (pH 10.8) thus obtained was returned to room temperature, to which was added 0.4 part of t-dodecylmercaptan with stirring at 350 rpm. Then 8 parts of 10% aqueous solution of sulfuric acid was added to form a partial coagulum (pH 3.0). The partial coagulum had a solid content of 28.3%. Then, while adding a mixture comprising 15.0 parts of styrene, 5.0 parts of acrylonitrile and 0.3 part of azobisisobutyronitrile, 10 parts of 0.3% aqueous solution of sulfonated polystyrene salt (number average molecular weight 20,000) as a suspension stabilizer was simultaneously added, whereby the dispersion changed from a highly viscous state to a low-viscosity state (10 centipoises). This dispersion was heated and polymerized at 80° C. for 5 hours. The polymer was collected by filtration, dehydrated by means of a basket type centrifugal dehydrating machine (the water content in the dehydrated, wet polymer powder was 27% based on dried bead), and then dried. Conversion of polymerization was 97%. The polymer thus obtained was beautiful beads and had a bulk density of 0.33 g/cc as well as the following particle size distribution.

| Particle size distribution (mesh) | −20 | 20–40 | 40–60 | 60–80 | 80–100 | 100 pass |
|---|---|---|---|---|---|---|
| Weight (%) | 5 | 69 | 24 | 2 | 0 | 0 |

35 Parts of the dry particles, 65 parts of acrylonitrile-styrene copolymer ($\eta_{sp}/C=0.61$ at 25° C. in DMF) and 0.4 part of calcium stearate were blended together at 3,000 rpm by means of Henschel mixer having a capacity of 10 liters and then pelletized, from which test pieces were prepared by injection molding. The molded product was free from thermal coloration and quite excellent in surface gloss.

COMPARATIVE EXAMPLE 2-1

Test pieces were prepared by repeating the treatment of Example 2, except that the polybutadiene latex used had a solid content of 50%, a degree of swelling of 24.8%, a gel content of 86.3%, a weight average particle diameter of $0.07\mu$ and a monomer composition of butadiene 100%.

COMPARATIVE EXAMPLE 2-2

A graft copolymer latex obtained in the same manner as in Example 2 was used, to which were added a monomer mixture, a coagulant and a suspension stabilizer in order of mention. Though a coagulated mass was formed in the course of heating and elevating temperature, test pieces were prepared therefrom by pulverization.

EXAMPLE 3-1

Emulsion polymerization was conducted in the same manner as in Example 2 except that 150 parts of deionized water in (Mixture 1) of Example 2 was changed to 67 parts, to obtain a graft copolymer latex of pH 11.0. Conversion of polymerization was 90%, free polymer rate of the graft copolymer was 35%, and $\eta_{sp}/C$ of the acetone-soluble fraction was 0.52 dl/g. To the latex was added, as in Example 2, 0.4 part of t-dodecylmercaptan followed by 8 parts of a 10% aqueous sulfuric acid solution, to obtain a partial coagulum of pH 2.8. The partial coagulum had a solid content of 40%. Thereto was added 83 parts of deionized water and thereafter polymerization was conducted in a manner similar to Example 2 to obtain good polymer beads having a water content of 22% after centrifugal dehydration based on dried beads and a bulk density of 0.43 after drying. Using these beads, similarly to Example 2, a molded product was prepared. It was free from thermal coloration and excellent in surface gloss.

EXAMPLE 3-2

Emulsion polymerization was conducted in the same manner as in Example 2 except that 150 parts of deionized water in (Mixture 1) of Example 2 was changed to 35 parts, to obtain a graft copolymer latex of pH 11.0. Conversion of polymerization was 91%, free polymer rate of the graft copolymer was 34%, and $\eta_{sp}/C$ of the acetone-soluble fraction was 0.50 dl/g. To the latex was added, as in Example 2, 0.4 part of t-dodecylmercaptan followed by 8 parts of a 10% aqueous sulfuric acid solution, to obtain a partial coagulum of pH 2.9. The partial coagulum had a solid content of 47.6%. Thereto was added 115 parts of deionized water and thereafter polymerization was conducted in a manner similar to that of Example 2 to obtain good polymer beads having a water content of 18% after centrifugal dehydration based on dried beads and a bulk density of 0.49 after drying. Using these beads, similarly to Example 2, a molded product was prepared. It was free from thermal coloration and excellent in surface gloss.

COMPARATIVE EXAMPLE 3-1

To the graft copolymer latex obtained in Example 2, in a manner similar to that of Example 2, was added 0.4 part of t-dodecylmercaptan followed by 300 parts of deionized water. Thereafter, there was added 8 parts of a 10% aqueous sulfuric acid solution, whereby a partial coagulum of pH 3.2 was obtained. The partial coagulum had a solid content of 13.7%. Subsequently, in the same manner as in Example 2, suspension polymerization was conducted to obtain polymer beads. The beads had (a) a water content of 42% after centrifugal dehydration based on dried beads, (b) a poorer drying characteristics as compared with beads obtained in Example 2, Example 3-1 and Example 3-2, and (c) a low bulk density of 0.21 after drying. Using these beads, similarly to Example 2, a molded product was prepared but it had a slightly poor appearance.

COMPARATIVE EXAMPLE 3-2

Emulsion polymerization was conducted in the same manner as in Example 2 except that 150 parts of deionized water in (Mixture 1) of Example 2 was changed to 20 parts. Agglomerated cullets were formed in large quantities and a graft copolymer latex after removal of these cullets had a high viscosity of 300 cp. at 25° C. To the latex was added, similarly to Example 2, 0.4 part of t-dodecylmercaptan followed by 8 parts of a 10% aqueous sulfuric acid solution, to obtain a partial coagulum of pH 2.8. The partial coagulum had a solid content of 52.3%. Thereto was added 130 parts of deionized water in order to carry out polymerization in a similar manner to that of Example 2. However, agglomeration took place right after temperature increase and thereby polymerization could not be performed.

EXAMPLE 4

| (Mixture 1) | |
|---|---|
| Diene latex (solid content)* | 120 parts (60 parts) |
| Dextrose | 1.0 part |
| Disproportionated rosin acid soap | 2.5 parts |
| Sodium hydroxide | 0.06 part |
| Sodium methylenebisnaphthalene-sulfonate | 0.2 part |
| Deionized water | 180 parts |

*The same as used in Example 1

| (Mixture 2) | |
|---|---|
| Styrene | 18.5 parts |
| Acrylonitrile | 6.5 parts |
| Cumene hydroperoxide | 0.3 part |
| t-Dodecylmercaptan | 0.1 part |

| (Mixture 3) | |
|---|---|
| Ferrous sulfate | 0.005 part |
| Sodium pyrophosphate | 0.2 part |
| Deionized water | 20 parts |

(Mixture 1) was charged into a reactor. After replacing the inner atmosphere of the reactor with nitrogen, (Mixture 2) was dropped thereinto for 60 minutes at 60° C. with stirring at a stirring speed of 200 rpm. When 30 minutes had elapsed after starting the dropping of (Mixture 2), (Mixture 3) was dropped for 5 minutes. After completion of the dropping of (Mixture 2), polymerization was conducted for 3 hours to complete the reaction, whereby a graft copolymer latex was obtained. Conversion of polymerization was 84%, free polymer rate of the graft copolymer was 21%, and $\eta_{sp}/C$ of the acetone-soluble fraction was 0.37 dl/g.

To the graft copolymer latex, similarly in Example 1, was added 0.4 part of t-dodecylmercaptan. Thereafter, 8 parts of a 10% aqueous sulfuric acid solution was added thereto to obtain a partial coagulum. The partial coagulum had a solid content of 24%.

Then, suspension polymerization was carried out by repeating the procedure of Example 1, except that a mixture comprising 11.1 parts of styrene, 3.9 parts of acrylonitrile, 0.1 part of benzoyl peroxide and 0.2 part of t-butylmercaptan was added to the graft copolymer latex obtained above. Thus, polymer beads having a water content of 31% based on dried bead and a bulk density of 0.30 g/cc after drying were obtained. 25 Parts of the dry particles, 75 parts of acrylonitrile-styrene copolymer ($\eta_{sp}/C=0.60$ at 25° C. in DMF) and 0.4 part of calcium stearate were blended together by means of Henschel mixer having a capacity of 10 liters at 3,000 rpm and then pelletized, from which test pieces were prepared by injection molding. The molded product was free from thermal coloration and quite excellent in surface gloss.

The characteristic properties of the resins obtained in the above-mentioned examples and comparative examples are summarized in Table 1.

TABLE 1

| | Properties as powder (beads) | | Notched Izod impact strength*1 (kg · cm/cm$^2$) | Surface*2 gloss (%) molded at 250° C. | Flow*3 (cc/min) 200° C., 5 kg load | Appearance*4 of molded product |
|---|---|---|---|---|---|---|
| | Water content of wet powder*5 (based on dry powder) (%) | Bulk density (g/cc) | | | | |
| Example 1 | 30 | 0.30 | 27 | 93 | 0.22 | o |
| Comparative Example 1-1 | — | — | 19 | 92 | 0.10 | x |
| Comparative Example 1-2 | — | — | 14 | 94 | 0.29 | o |
| Example 2 | 27 | 0.33 | 27 | 95 | 0.20 | o |
| Comparative Example 2-1 | — | — | 9 | 89 | 0.16 | x |
| Comparative Example 2-2 | — | — | 16 | 93 | 0.22 | x |
| Example 3-1 | 22 | 0.43 | 27 | 96 | 0.22 | x |
| Example 3-2 | 18 | 0.49 | 26 | 94 | 0.21 | o |
| Comparative Example 3-1 | 42 | 0.21 | 25 | 90 | 0.20 | Δ |
| Example 4 | 31 | 0.30 | 26 | 95 | 0.19 | o |

*1Measured according to ASTM-D-256
*2Measured according to JIS-Z-8741 with Murakami Glossmeter
*3Melt index, measured according to ASTM-D-1238
*4Appearance of injection-molded flat plate; o: Good, Δ: Slight Bad, x: Bad
*5Measured after 5 minutes dehydration in a basket type centrifugal dehydrating machine ($\phi$ = 500 mm, 1850 r.p.m.)

EXAMPLE 5

| Polybutadiene latex (solid content)* | 80 parts (40 parts) |
|---|---|
| Styrene | 25.9 parts |

-continued

| | |
|---|---|
| Acrylonitrile | 9.1 parts |
| Ferrous sulfate | 0.0045 part |
| Dextrose | 0.3 part |
| Cumene hydroperoxide | 0.35 part |
| t-Dodecylmercaptan | 0.35 part |
| Sodium pyrophosphate | 0.15 part |
| Disproportionated rosin acid soap | 1.0 part |
| Sodium hydroxide | 0.015 part |
| Sodium methylenebisnaphthalene-sulfonate | 0.12 part |
| Deionized water | 210 parts |

\* { Solid content 51.5%
Degree of swelling 17
Gel content 84%
Weight average particle diameter 0.40μ }

A mixture having the above-mentioned composition was charged into a reactor. After replacing the inner atmosphere of the reactor with nitrogen, polymerization was conducted at 70° C. for 2 hours at a stirring speed of 200 rpm to complete the reaction, whereby a graft copolymer latex was obtained. Conversion of polymerization was 92%, free polymer rate of the graft copolymer was 46%, and $\eta_{sp}/C$ of the acetone-soluble fraction was 0.48 dl/g.

The graft copolymer latex thus formed was cooled to 30° C., to which was added 5 parts of 10% aqueous solution of sulfuric acid with stirring of 350 rpm to form a highly viscous partial coagulum. The partial coagulum had a solid content of 22.7%. Then, a mixture comprising 18.5 parts of styrene, 6.5 parts of acrylonitrile, 0.25 part of lauroyl peroxide and 0.5 part of t-dodecylmercaptan was added, and then 10 parts of 3% aqueous solution of methyl methacrylate-potassium acrylate copolymer was added as a suspension polymerization stabilizer, whereby the system shifted from the highly viscous state to a suspended dispersion of low-viscosity state (about 10 centipoises). This dispersion was heated and polymerized at 80° C. for 1.5 hours (polymerization conversion of suspension part: 70%), a liquid obtained by uniformly dispersing 0.2 part of 2,2'-methylenebis(4-methyl-6-t-butylphenol) in 10 parts of deionized water with 0.05 part of disproportionated rosin acid soap was added, and the resulting mixture was heated and polymerized for an additional 1.5 hours. At this time, conversion of polymerization was 97%.

The polymer was collected by filtration and dehydrated with a basket type centrifugal dehydrating machine. Imagining the residence of polymer particles in the continuous drying process using fluidized-bed dryer, the wet powder thus obtained was dried at 100° C. for 20 days by means of a hot air circulation type steam dryer. However, no coloration of dry powder due to thermal deterioration was observed. 37.5 parts of the polymer thus obtained, 62.5 parts of acrylonitrile-styrene copolymer ($\eta_{sp}/C=0.61$ at 25° C. in DMF), 0.4 part of calcium stearate and 0.4 part of ethylenebisstearylamide were blended together in a Henschel mixer having a capacity of 10 liters at 3,000 rpm for 5 minutes and then pelletized by extrusion, from which test pieces for measuring notched Izod impact strength and flat plates having a thickness of 1.5 mm were prepared by means of a screw type injection molding machine (cylinder temperature 220° C., die temperature 60° C.). By using them, Izod impact strength and yellowness were measured. The results were both good. These results, as well as the extent of coloration of dry powder, are shown in Table 2.

EXAMPLE 6

The dispersion obtained in the same manner as in Example 1 was heated and polymerized at 80° C. for 2 hours (conversion of suspension polymerization: 80%), a liquid obtained by uniformly dispersing 0.3 part of 2,6-di-t-butyl-p-cresol into 10 parts of deionized water with 0.05 part of disproportionated rosin acid soap was added, and the resulting mixture was heated and polymerized for an additional 1 hour. At this time, conversion of polymerization was 96.8%. The product was evaluated in the same manner as in Example 1. The results were good (Table 2).

EXAMPLE 7

A polymer powder was produced (conversion of polymerization: 97.2%) and evaluated in the same manner as in Example 1, except that 2,2'-methylenebis(4-methyl-6-t-butylphenol) was added in an amount of 0.1 part and the 0.05 part of disproportionated rosin acid soap was replaced with 0.05 part of partially saponified polyvinyl alcohol (Gosenol KH-17, manufactured by Nippon Gosei Kagaku). The results were good (Table 2).

EXAMPLE 8

A polymer powder was produced (conversion of polymerization: 97.0%) and evaluated in the same manner as in Example 1, except that 0.2 part of 2,2'-methylenebis(4-methyl-6-t-butylphenol) was dissolved into 0.5 part of toluene and then added. The results were good (Table 2).

EXAMPLE 9

A polymer powder was produced (conversion of polymerization: 97.0%) and evaluated in the same manner as in Example 6, except that the 0.2 part of 2,2'-methylenebis(4-methyl-6-butylphenol) was replaced with 0.3 part of 2,6-t-butyl-p-cresol. The results were good (Table 2).

EXAMPLE 10

A polymer powder was produced (conversion of polymerization: 97.0%) and evaluated in the same manner as in Example 1, except that 0.2 part of 2,2'-methylenebis(4-methyl-6-t-butylphenol) was dissolved into 0.6 part of styrene and then added. The results were good (Table 2).

TABLE 2

| | Extent of coloration of dry powder*1 (100° C., 20 days) | Yellowness of flat plate*2 | Notched Izod impact strength*3 (kg · cm/cm²) |
|---|---|---|---|
| Example 5 | o | 0.19 | 26.5 |
| Example 6 | o | 0.21 | 26.0 |
| Example 7 | o | 0.20 | 26.0 |
| Example 8 | o | 0.18 | 26.7 |
| Example 9 | o | 0.21 | 26.3 |
| Example 10 | o | 0.19 | 26.5 |

*¹o: No coloration, Δ: Slight coloration, x: Coloration, #: Marked coloration
*²X, Y and Z were calculated and yellowness was expressed according to the following equation:
Yellowness = $\frac{1.28X - 1.06Z}{Y}$
(Hitachi Color Analyzer type 307 was used.)
*³Measured according to ASTM-D-256

What is claimed is:

1. In a process comprising adding an ethylenic monomer or monomer mixture (B) to a rubbery polymer (A)

latex, emulsion-polymerizing it to produce a graft copolymer (C) latex, then adding an acidic substance or an electrolyte to said graft copolymer (C) latex to partially coagulate the latex, and thereafter either first adding an ethylenic monomer or monomer mixture (D) and then adding a suspension polymerization stabilizer or simultaneously adding an ethylenic monomer or monomer mixture (D) and a suspension polymerization stabilizer, and carrying out suspension polymerization to obtain a graft copolymer (E) in the form of beads, a process for producing an impactresistant resin wherein:

(1) said rubbery polymer (A) contains at least 60% by weight of a diene monomer component and has a degree of swelling of 10–35, a gel content of 70% by weight or more and a weight average particle diameter of 0.2–0.5μ and the major part of the particles has a particle diameter ranging from 0.03μ to 1.0μ;

(2) said ethylenic monomer or monomer mixture of (B) and (D) independently comprising 50–100% by weight of an aromatic vinyl monomer and 50–0% by weight of a vinyl monomer copolymerizable therewith;

(3) said graft copolymer (C) has a free polymer rate of 10% or higher and a reduced viscosity ($\eta_{sp}/C$), determined by dissolving 0.1 g of its acetone-soluble fraction into 100 ml of N,N-dimethylformamide and measuring the viscosity at 20° C., or 0.3–1.0 dl/g;

(4) said rubbery polymer (A) is 25–70% by weight in said graft copolymer (E); and (5) said acidic substance or electrolyte is added to said graft copolymer (C) latex to form a partial coagulum with a solid content of 15–50%.

2. A process for producing an impact-resistant resin according to claim 1, wherein a phenolic compound is added in the course of suspension polymerization in an amount of 0.001% by weight or more based on the polymerized product.

3. A process for producing an impact-resistant resin according to claim 1, wherein said rubbery polymer (A) is polybutadiene or a copolymer comprising 80% by weight or more of butadiene and 20% by weight or less of styrene.

4. A process for producing an impact-resistant resin according to claim 1, wherein said acidic substance or electrolyte is added to said graft copolymer (C) latex to form a partial coagulum with a solid content of 20–40%.

5. A process for producing an impact-resistant resin according to claim 1, wherein the ethylenic monomer or monomer mixture of (B) and (D) is styrene or a mixture comprising 60% by weight or more of styrene and 40% by weight or less of acrylonitrile.

6. A process for producing an impact-resistant resin according to claim 1, wherein the emulsion polymerization and the suspension polymerization are carried out by adding 0.1–2% by weight of alkylmercaptan having $C_4$–$C_{12}$ alkyl group.

7. A process for producing an impact-resistant resin according to claim 1, wherein at least one member selected from the group consisting of sulfonated polystyrene salts, methyl methacrylate-methacrylic acid salt copolymers, methyl methacrylate-acrylic acid salt copolymers and polyvinyl alcohol is used as a suspension polymerization stabilizer.

8. A process for producing an impact-resistant resin according to claim 1, wherein at least one member selected from the group consisting of organic acids having a dissociation constant of $10^{-6}$ mole/liter or more and mineral acids is used as said acidic substance.

9. A process according to claim 2, wherein at least one member selected from the group consisting of 2,6-di-t-butyl-p-cresol, 2,4-dimethyl-6-t-butylphenol, 2,2'-methylenebis(4-methyl-6-t-butylphenol), 4,4'-butylidenebis(3-methyl-6-t-butylphenol) and 4,4'-thiobis(3-methyl-6-t-butylphenol) is used as said phenolic compound.

10. A process according to claim 2, wherein said phenolic compound is dispersed into water with a surfactant and then added.

11. A process according to claim 2, wherein said phenolic compound is added after the conversion of suspension polymerization has exceeded 50%.

12. A process for producing an impact-resistant resin which is constituted of a resin obtained by the process of claim 1 and at least one kind of resin selected from the group consisting of polypropylene, polystyrene, acrylonitrile-styrene copolymer, methyl methacrylate type resins, polyvinyl chloride, polyvinylidene chloride, polycarbonate, thermoplastic polyester and polyamide.

* * * * *